United States Patent Office 2,754,217
Patented July 10, 1956

2,754,217

FIRE RETARDANT PAINT

Austin O. Allen, East Orange, Thomas M. Murray, Morris Plains, and Felix P. Liberti, Totowa, N. J., assignors to Vita-Var Corporation, Newark, N. J., a corporation of New Jersey No Drawing. Application June 26, 1953,
Serial No. 364,494

12 Claims. (Cl. 106—15)

This invention relates to fire retardant paints or coatings which may be used to protect an underlying inflammable structure, including protective and decorative coatings for either exterior or interior use.

The problem of providing a fire-retardant paint or coating is an old one, and many solutions to it have been proposed. It has been recognized that to make an effective fire retardant paint, one or more of the following expedients must be used:

(1) The substitution of an incombustible material for a combustible material in a known paint composition;

(2) The addition of an ingredient which, when heated, liberates noninflammable gases to smother the flame;

(3) The addition of an ingredient which, when heated, releases a gas giving intumescent properties to the paint film, i. e. it bubbles and swells to form a thick cellular mat which serves to insulate the painted structure from the flame;

(4) The addition of an ingredient which will melt when exposed to heat and flux to a glass-like material which tends to retard and prevent the spread of flame.

To be practical as protective and decorative coatings, fire retardant paints must have fire retardant properties as durable under all service conditions as the protective and decorative properties. A paint which retains its protective and decorative properties after its fire retardant properties are lost is dangerous, since it gives an appearance of safety when it is in fact unsafe.

The fire retardant paints of the prior art have not been practical as protective and decorative coatings because:

(1) The exterior finishes do not retain their fire retardant properties after exposure to weather and do not have durability nor give protection equivalent to that of conventional exterior paints;

(2) The interior finishes lose their fire retardant characteristics when washed or when they otherwise come in contact with water.

The mat-forming or intumescent materials suggested in the prior art have been more or less water soluble, so that upon exposure to weather, the fire retarding properties of the paints containing such materials were reduced substantially. The intumescent materials of the prior art have typically been paint pigment components or solid ingredients rather than vehicle components.

The applicants have discovered certain materials which have many of the film-forming properties required in the non-volatile components of paint vehicles, which are insoluble in water and which have outstanding intumescent properties when exposed to flame. At the same time, these materials do not detract from the service properties of the paint, and in some cases actually improve the service properties.

One of the film-forming materials of this type which the applicants have discovered is isano oil, also known as ongokea oil. This oil is obtained by pressing boleko nuts, which are native to Africa. So far as the applicants can determine, there is no known commercial utility for these nuts or their oil in this country.

This intumescent property is not known to exist in any other film-forming vegetable oil. The intumescent qualities of isano oil are remarkable as compared to other vegetable oils and film-forming materials because of the violence of the chemical reaction which takes place when this oil or a film containing it is subjected to heat. This reaction releases gases which cause a swelling and thickening of the film to form an improved insulation for the underlying flammable surface by preventing the underlying flammable surface from reaching the temperature necessary for combustion. It is to be noted that raw isano oil is used since treating or processing it in any manner using heat has been found to destroy this unique intumescent property.

The applicants have also discovered a class of film-forming intumescent materials suitable for use in paint vehicles. These are nitrogen-containing resinous materials which decompose to liberate gaseous nitrogen or nitrogen-containing gas upon heating. Outstanding in this class are the polyamide resins, although many of the formaldehyde resins, notably melamine, urea and triazine formaldehyde resins have been found to be very satisfactory. For purposes of definition these formaldehyde resins are referred to generically in this specification as the amine formaldehyde resins. For the purposes of the present invention, a polyamide resin may be defined as a product obtained by reacting a polymerized unsaturated vegetable acid with an amine. By way of example, the acid may be dimerized and trimerized linoleic and linolenic acids of soy bean oil, and the amine may be ethylene diamide. Polyamide resins are a known article of commerce. One example of such a resin is Polyamide Resin No. 93, obtainable from General Mills, Inc., Chemical Division.

The applicants have discovered a remarkable synergistic effect from the incorporation of both isano oil and one of the nitrogen-containing resinous materials in a paint vehicle. The applicants have further discovered that the paint vehicle may and preferably should also include conventional film-forming materials, for example, drying or semi-drying oils, alkyd resins, and oleoresinous materials; chlorinated paraffins; and that paint vehicles employing these principles may be so prepared that the desirable qualities of a conventional paint are retained in the resulting product, especially with regard to decorative appearance, ease of application, durability and washability, while still retaining superior fire retardant properties.

Since isano oil has film-forming properties, it is possible to make a paint using it as the only non-volatile component of the vehicle. Similarly, the polyamide resins have film-forming properties which make it possible to use them as the only non-volatile component in a paint vehicle. It has also been found that a paint commercially effective as a fire-retardant paint may be made by using isano oil and polyamide resin as the only non-volatile vehicle components. Any of the paints formulated as suggested immediately above exhibits the outstanding fire retardant properties which are characteristic of paints prepared in accordance with the present invention.

It is greatly preferred, however, to mix the novel intumescent film-forming materials of the present invention with the less expensive conventional film-forming materials, such as those mentioned above, for reasons of economy and also in order to incorporate in the finished paint the desirable properties of such conventional materials, especially with respect to decorative appearance, ease of application, drying time, and protective qualities including durability under conditions of weathering, washing and wear.

Paint vehicles may be prepared using a mixture of a drying oil, e. g., linseed oil, and either isano oil or a resinous material selected from the class consisting of polyamide resins and amine formaldehyde resins as the only film-forming materials in the vehicle. It is greatly preferred, however, that paint vehicles prepared in accordance with the present invention should contain from about 10% to about 60% isano oil and from about 5% to about 25% polyamide resin. They should also contain conventional film-forming material such as a vegetable drying oil, preferably linseed oil, in a proportion of about 15% to 50%.

It has been found that, within the broad ranges of proportions set forth above, particularly successful and desirable results are obtained if the isano oil is between 13% and 30% of the vehicle, the polyamide resin 7% to 11%, and the conventional film-forming material 19% to 40%.

There are set forth below in tabular form eight examples of paints mixed in accordance with the principles of the present invention, each paint employing both a conventional film-forming material and at least one of the novel intumescent materials. Examples I and II contain isano oil and polyamide resin. Examples III and IV contain melamine formaldehyde resin and triazine formaldehyde resin, respectively, in place of the polyamide resin of Examples I and II. Examples V and VI contain isano oil but no nitrogen-containing resin. Examples VII and VIII contain polyamide resin but no isano oil.

In each example there is given the weight and the percentage of each ingredient in the mixture. The percentage of each pigment ingredient in the total pigment, and the percentage of each vehicle ingredient in the total vehicle are also given.

*Example I*

| Pigment and other Solid Components | Weight (Lbs.) | Percent Pigment | Percent of Total Paint |
| --- | --- | --- | --- |
| Titanium Dioxide | 100.0 | 10.30 | 6.28 |
| Zinc Borate | 292.0 | 30.04 | 18.31 |
| Blanc Fixe | 148.0 | 15.21 | 9.27 |
| Lead Sulfate | 168.5 | 17.33 | 10.56 |
| Lead Carbonate | 168.5 | 17.33 | 10.56 |
| Zinc Oxide | 95.0 | 9.79 | 5.96 |
| Total Pigment | 972.0 | 100.00 | 60.94 |

| Vehicle Components | Weight (Lbs.) | Percent Vehicle | Percent of Total Paint |
| --- | --- | --- | --- |
| XX Refined Linseed Oil | 170.0 | 27.28 | 10.66 |
| Raw Isano Oil | 170.0 | 27.28 | 10.66 |
| Chlorinated Paraffin 70% | 70.0 | 11.23 | 4.39 |
| Polyamide #93 Resin | 64.0 | 10.27 | 4.01 |
| Cobalt Naphthenate Solution (2% Cobalt as Metal) | 5.5 | .88 | .34 |
| Lead Naphthenate Solution (8% Lead as Metal) | 24.0 | 3.85 | 1.50 |
| Manganese Naphthenate Solution (2% Manganese as Metal) | 3.5 | .56 | .22 |
| Volatile Organic Solvents | 116.0 | 18.65 | 7.28 |
| Total Vehicle | 623.0 | 100.00 | 39.06 |
| Grand Totals | 1,595.0 | | 100.00 |

*Example II*

| Pigment and other Solid Components | Weight (Lbs.) | Percent Pigment | Percent of Total Paint |
| --- | --- | --- | --- |
| Titanium Dioxide | 87.0 | 8.35 | 5.46 |
| Zinc Borate | 253.0 | 24.29 | 15.89 |
| Blanc Fixe | 128.0 | 12.29 | 8.04 |
| Lead Sulfate | 146.0 | 14.02 | 9.17 |
| Lead Carbonate | 146.0 | 14.02 | 9.17 |
| Benzene Sulfonyl Hydrazide | 200.0 | 19.20 | 12.55 |
| Zinc Oxide | 81.5 | 7.83 | 5.12 |
| Total Pigment | 1,041.5 | 100.00 | 65.40 |

| Vehicle Components | Weight (Lbs.) | Percent Vehicle | Percent of Total Paint |
| --- | --- | --- | --- |
| XX Refined Linseed Oil | 147.0 | 26.68 | 9.23 |
| Raw Isano Oil | 147.0 | 26.68 | 9.23 |
| Chlorinated Paraffin 70% | 60.5 | 10.98 | 3.80 |
| Polyamide #93 Resin | 55.2 | 10.02 | 3.47 |
| Cobalt Naphthenate Solution (2% Cobalt as Metal) | 4.7 | .85 | .29 |
| Lead Naphthenate Solution (8% Lead as Metal) | 20.8 | 3.77 | 1.30 |
| Manganese Naphthenate Solution (2% Manganese as Metal) | 3.0 | .55 | .20 |
| Volatile Organic Solvents | 112.8 | 20.47 | 7.08 |
| Total Vehicle | 551.0 | 100.00 | 34.60 |
| Grand Totals | 1,592.5 | | 100.00 |

*Example III*

| Pigment and other Solid Components | Weight (Lbs.) | Percent Pigment | Percent of Total Paint |
| --- | --- | --- | --- |
| Titanium Dioxide | 100.0 | 10.30 | 6.41 |
| Zinc Borate | 292.0 | 30.10 | 18.73 |
| Blanc Fixe | 148.0 | 15.22 | 9.47 |
| Lead Sulfate | 168.5 | 17.30 | 10.77 |
| Lead Carbonate | 168.5 | 17.30 | 10.77 |
| Zinc Oxide | 95.0 | 9.78 | 6.09 |
| Total Pigment | 972.0 | 100.00 | 62.24 |

| Vehicle Components | Weight (Lbs.) | Percent Vehicle | Percent of Total Paint |
| --- | --- | --- | --- |
| XX Refined Linseed Oil | 170.0 | 28.84 | 10.89 |
| Raw Isano Oil | 170.0 | 28.84 | 10.89 |
| Chlorinated Paraffin 70% | 70.0 | 11.87 | 4.48 |
| Melamine Formaldehyde Resin | 64.0 | 10.86 | 4.10 |
| Cobalt Naphthenate Solution (2% Cobalt as Metal) | 5.5 | .93 | .35 |
| Lead Naphthenate Solution (8% Lead as Metal) | 24.0 | 4.07 | 1.54 |
| Manganese Naphthenate Solution (2% Manganese as Metal) | 3.5 | .59 | .22 |
| Volatile Organic Solvents | 82.5 | 14.00 | 5.29 |
| Total Vehicle | 589.5 | 100.00 | 37.76 |
| Grand Totals | 1,561.5 | | 100.00 |

*Example IV*

| Pigment and other Solid Components | Weight (Lbs.) | Percent Pigment | Percent of Total Paint |
| --- | --- | --- | --- |
| Titanium Dioxide | 100.0 | 10.30 | 6.45 |
| Zinc Borate | 292.0 | 30.10 | 18.85 |
| Blanc Fixe | 148.0 | 15.22 | 9.54 |
| Lead Sulfate | 168.5 | 17.30 | 10.84 |
| Lead Carbonate | 168.5 | 17.30 | 10.84 |
| Zinc Oxide | 95.0 | 9.78 | 6.13 |
| Total Pigment | 972.0 | 100.00 | 62.65 |

| Vehicle Components | Weight (Lbs.) | Percent Vehicle | Percent of Total Paint |
| --- | --- | --- | --- |
| XX Refined Linseed Oil | 170.0 | 29.31 | 10.95 |
| Raw Isano Oil | 170.0 | 29.31 | 10.95 |
| Chlorinated Paraffin 70% | 70.0 | 12.10 | 4.52 |
| Triazine Formaldehyde Resin | 64.0 | 11.05 | 4.13 |
| Cobalt Naphthenate Solution (2% Cobalt as Metal) | 5.5 | .95 | .35 |
| Lead Naphthenate Solution (8% Lead as Metal) | 24.0 | 4.15 | 1.55 |
| Manganese Naphthenate Solution (2% Manganese as Metal) | 3.5 | .60 | .22 |
| Volatile Organic Solvents | 72.5 | 12.53 | 4.68 |
| Total Vehicle | 579.5 | 100.00 | 37.35 |
| Grand Totals | 1,551.5 | | 100.00 |

Example V

| Pigment and other Solid Components | Weight (Lbs.) | Percent Pigment | Percent of Total Paint |
|---|---|---|---|
| Titanium Dioxide | 250.0 | 41.70 | 22.56 |
| Zinc Borate | 228.0 | 38.03 | 20.57 |
| Calcium Carbonate | 76.5 | 12.76 | 6.90 |
| Magnesium Silicate | 45.0 | 7.51 | 4.06 |
| Total Pigment | 599.5 | 100.00 | 54.09 |

| Vehicle Components | Weight (Lbs.) | Percent Vehicle | Percent of Total Paint |
|---|---|---|---|
| XX Refined Linseed Oil | 151.2 | 29.71 | 13.64 |
| Raw Isano Oil | 151.2 | 29.71 | 13.64 |
| Chlorinated Paraffin 70% | 73.0 | 14.34 | 6.58 |
| Lead Naphthenate Solution (8% Lead as Metal) | 30.0 | 5.90 | 2.71 |
| Manganese Naphthenate Solution (2% Manganese as Metal) | 10.5 | 2.06 | .95 |
| Volatile Organic Solvents | 93.0 | 18.28 | 8.39 |
| Total Vehicle | 508.9 | 100.0 | 45.91 |
| Grand Totals | 1,108.4 | | 100.00 |

Example VI

| Pigment and other Solid Components | Weight (Lbs.) | Percent Pigment | Percent of Total Paint |
|---|---|---|---|
| Titanium Dioxide | 250.0 | 37.20 | 22.10 |
| Zinc Borate | 180.0 | 26.79 | 15.92 |
| Starch | 242.0 | 36.01 | 21.40 |
| Total Pigments | 672.0 | 100.00 | 59.42 |

| Vehicle Components | Weight (Lbs.) | Percent Vehicle | Percent of Total Paint |
|---|---|---|---|
| Alkyd Resin | 73.8 | 16.08 | 6.53 |
| Raw Isano Oil | 123.0 | 26.80 | 10.87 |
| Chlorinated paraffin 70% | 55.0 | 11.98 | 4.86 |
| Sulphonated Oil | 4.0 | .87 | .35 |
| Lead Naphthenate Solution (8% Lead as Metal) | 20.0 | 4.36 | 1.77 |
| Manganese Naphthenate Solution (2% Manganese as Metal) | 9.0 | 1.96 | .80 |
| Volatile Organic Solvents | 174.2 | 37.95 | 15.40 |
| Total Vehicle | 459.0 | 100.00 | 40.58 |
| Grand Totals | 1,130.0 | | 100.00 |

Example VII

| Pigment and other Solid Components | Weight (Lbs.) | Percent Pigment | Percent of Total Paint |
|---|---|---|---|
| Titanium Dioxide | 100.0 | 10.31 | 6.28 |
| Zinc Borate | 290.0 | 29.90 | 18.21 |
| Blanc Fixe | 148.0 | 15.26 | 9.29 |
| Lead Sulfate | 168.5 | 17.37 | 10.58 |
| Lead Carbonate | 168.5 | 17.37 | 10.58 |
| Zinc Oxide | 95.0 | 9.79 | 5.95 |
| Total Pigment | 970.0 | 100.00 | 60.89 |

| Vehicle Components | Weight (Lbs.) | Percent Vehicle | Percent of Total Paint |
|---|---|---|---|
| XX Refined Linseed Oil | 340.0 | 54.58 | 21.34 |
| Chlorinated Paraffin 70% | 70.0 | 11.24 | 4.40 |
| Polyamide #93 Resin | 64.0 | 10.27 | 4.02 |
| Cobalt Naphthenate Solution (2% Cobalt as Metal) | 5.5 | .88 | .34 |
| Lead Naphthenate Solution (8% Lead as Metal) | 24.0 | 3.85 | 1.51 |
| Manganese Naphthenate Solution (2% Manganese as Metal) | 3.5 | .56 | .22 |
| Volatile Organic Solvents | 116.0 | 18.62 | 7.28 |
| Total Vehicle | 623.0 | 100.00 | 39.11 |
| Grand Totals | 1,593.0 | | 100.00 |

Example VIII

| Pigment and other Solid Components | Weight (Lbs.) | Percent Pigment | Percent of Total Paint |
|---|---|---|---|
| Titanium Dioxide | 119.0 | 15.43 | 8.67 |
| Zinc Borate | 218.0 | 28.28 | 15.89 |
| Blanc Fixe | 111.0 | 14.40 | 8.09 |
| Lead Sulfate | 126.0 | 16.34 | 9.18 |
| Lead Carbonate | 126.0 | 16.34 | 9.18 |
| Zinc Oxide | 71.0 | 9.21 | 5.18 |
| Total Pigments | 771.0 | 100.00 | 56.19 |

| Vehicle Components | Weight (Lbs.) | Percent Vehicle | Percent of Total Paint |
|---|---|---|---|
| XX Refined Linseed Oil | 210.0 | 34.94 | 15.31 |
| Chlorinated Paraffin 70% | 52.4 | 8.72 | 3.82 |
| Polyamide #93 Resin | 89.5 | 14.89 | 6.52 |
| Cobalt Naphthenate Solution (2% Cobalt as Metal) | 4.1 | .68 | .30 |
| Lead Naphthenate Solution (8% Lead as Metal) | 18.0 | 2.99 | 1.31 |
| Manganese Naphthenate Solution (2% Manganese as Metal) | 2.6 | .43 | .19 |
| Volatile Organic Solvents | 224.5 | 37.35 | 16.36 |
| Total Vehicle | 601.1 | 100.00 | 43.81 |
| Grand Total | 1,371.1 | | 100.00 |

The following table sets forth test results which were obtained with each of the foregoing eight examples. In each case, sample poplar panels, 6" x 12" x ¼", were made up and painted, each with two coats of one of the paints undergoing test. After drying, the panels were given a standard burn test which was recommended to us by the Engineer Research and Development Laboratories, U. S. Army, Fort Belvoir, Virginia. In this test, each panel is placed in a standard cabinet known as a New York Paint and Varnish Production Club Test Cabinet, having standard size and ventilation provisions. A cup containing 5 cc. of absolute alcohol is placed one inch from the face of the panel and ignited. The test continues until all burning ceases. The charred area and the loss in weight of each panel is measured. The times at which the flames go out in the fuel cup and on the panel are also noted. Although other measurements are made and other criteria are considered in evaluating the test results, three of the most important criteria are the percentage loss in weight, the time of persistence of the flame on the panel after the alcohol burns out, and the charred area.

The same test is repeated for each paint sample, with panels which are leached in distilled water for 40 hours at 120° F. The leached panels are dried for 72 hours at 120° F. before the burn test. The results for the leached and unleached panels are given in the table. Each test figure in the table represents an average of several tests. By way of contrast, the table sets forth the results of a similar test with a commercially available flame resistant paint product.

Table 1

| | Unleached Panels | | | Leached Panels | | |
|---|---|---|---|---|---|---|
| | Percent Wt. Loss | Persistence of Panel Flame (sec.) | Char Area (sq. in.) | Percent Wt. Loss | Persistence of Panel Flame (sec.) | Char Area (sq. in.) |
| Example I | 5.33 | −4 | 13.75 | 5.68 | 0 | 13.9 |
| II | 7.42 | 19 | | 7.05 | 1 | 16.92 |
| III | 7.57 | −3 | 18.96 | 8.06 | 1 | 24.8 |
| IV | 7.62 | 1 | 22.28 | 7.53 | −6 | 19.08 |
| V | 10.07 | 0 | 26.00 | 9.0 | 0 | 20.49 |
| VI | 8.70 | 2 | 18.67 | 9.7 | 0 | 31.30 |
| VII | 7.60 | 1 | 20.56 | 7.62 | 2 | 20.4 |
| VIII | 8.26 | −2 | 18.9 | 8.58 | 1 | 22.5 |
| Commercial Flame Resistant Paint | 8.31 | −1 | 21.38 | 15.64 | −4 | 44.28 |

A negative figure in the columns headed "Persistence of panel flame" in Table I indicates that the panel flame went out before the alcohol flame.

From the results of the tests shown in Table I, it may be seen that all the examples formulated in accordance with the invention produced markedly better results as to percentage weight loss than did the prior art commercial paint. These improved results are particularly outstanding in the case of the leached panels. The leached panels also show another remarkable improvement in the "char area" measurement.

By way of comparison between the various examples formulated in accordance with the present invention, it may be noted that the examples containing both isano oil and polyamide resin (Examples I and II), gave somewhat better results than the examples containing isano oil and other nitrogen-containing resins (Examples III and IV). It may also be observed that Examples I and II gave markedly better results than Examples VII and VIII, which contained no isano oil. Examples V and VI contained isano oil, but no nitrogen-containing resin, but the results, although indicating some value, are not as good as in Examples I and II.

It follows that there exists a remarkable synergistic effect from the use of a combination of isano oil and polyamide resin; other nitrogen-containing resinous materials show this effect to some extent, but to a lesser degree than the polyamide resin.

The paint mixtures may be prepared in a conventional manner. One preparation method which is convenient for use with Example I listed above is to mix the pigments with the linseed oil, isano oil and chlorinated paraffin components to form a uniform paste; then pass this paste over a conventional roller mill, set to give a fineness of 3–4 on a standard precision fineness gauge, such as the Fineness of Grind Gauge manufactured by Precision Gauge and Tool Co., of Dayton, Ohio. The other vehicle components are then added to this dispersed paste.

In many of the examples given above, the pigment components are selected for their known fire resistant properties. For example, zinc borate and zinc oxide are both known to have such properties. In some cases also, a vehicle component has been selected for its fire resistant properties, as for example the chlorinated paraffin used in all the examples. This material decomposes when heated, liberating chlorine which tends to smother the flames.

The mineral spirits mentioned in many of the examples are hydrocarbon fractions which may be replaced by any volatile organic solvent. The function of this component in the mixture is simply to reduce the viscosity to a point where it is suitable for application. The naphthenates included in the examples are well known dryers, used in many commercial paints.

While we have described specifically those embodiments of our invention which are presently preferred, many other modifications of the invention will readily occur to those skilled in the art, and we therefore intend our invention to be limited only by the appended claims.

We claim as our invention:

1. A fire-retardant paint effective to form a film having intumescent properties when subjected to heat, comprising pigment, volatile vehicle components and non-volatile vehicle components consisting essentially of at least 10% raw isano oil and at least 5% of a resinous compound selected from the class consisting of polyamide resins and amine formaldehyde resins.

2. A fire-retardant paint comprising fire-resistant pigment components, volatile vehicle components and non-volatile vehicle components consisting essentially of from about 10% to about 60% raw isano oil.

3. An intumescent film-forming vehicle for a fire-retardant paint comprising volatile vehicle components and non-volatile vehicle components consisting essentially of at least 10% raw isano oil and at least 5% of a resinous compound selected from the class consisting of polyamide resins and amine formaldehyde resins.

4. A vehicle for a fire-retardant paint comprising volatile vehicle components and non-volatile vehicle components consisting essentially of from about 10% to about 60% raw isano oil, from about 15% to about 50% of a vegetable drying oil, and from about 5% to about 25% of a resinous compound selected from the class consisting of polyamide resins and amine formaldehyde resins.

5. An intumescent film-forming vehicle for a fire-retardant paint comprising volatile vehicle components and non-volatile components consisting essentially of 10% to 60% raw isano oil and 5% to 25% of a resinous compound selected from the class consisting of polyamide resins and amine formaldehyde resins.

6. A vehicle for a fire-retardant paint comprising volatile components and non-volatile components consisting essentially of at least 10% raw isano oil, at least 15% of a vegetable drying oil and at least 10% chlorinated paraffin, and at least 5% of a resinous compound selected from the class consisting of polyamide resins and amine formaldehyde resins.

7. A vehicle for a fire-retardant paint comprising volatile vehicle components and non-volatile vehicle components consisting essentially of from 10% to 60% raw isano oil and 5 to 25% polyamide resin.

8. A vehicle for a fire-retardant paint comprising volatile vehicle components and non-volatile vehicle components consisting essentially of 13 to 30% raw isano oil, 7 to 11% polyamide resin.

9. A vehicle for a fire-retardant paint comprising volatile vehicle components and non-volatile vehicle components consisting essentially of 27.2% raw isano oil and 10.2% polyamide resin.

10. A vehicle for a fire-retardant paint comprising volatile vehicle components and non-volatile vehicle components consisting essentially of from 10% to 60% raw isano oil and 5 to 25% melamine formaldehyde resin.

11. A vehicle for a fire-retardant paint comprising volatile vehicle components and non-volatile vehicle components consisting essentially of from 10% to 60% raw isano oil and 5 to 25% urea formaldehyde resin.

12. A vehicle for a fire-retardant paint comprising volatile vehicle components and non-volatile vehicle components consisting essentially of from 10% to 60% raw isano oil and 5 to 25% triazine formaldehyde resin.

References Cited in the file of this patent

UNITED STATES PATENTS

| | | |
|---|---|---|
| 2,228,154 | Priester | Jan. 7, 1941 |
| 2,379,413 | Bradley | July 3, 1945 |
| 2,429,957 | La Cagnina | Oct. 28, 1947 |
| 2,550,682 | Falkenburg et al. | May 1, 1951 |
| 2,596,938 | Nielsen et al. | May 13, 1952 |
| 2,630,397 | Cowan et al. | Mar. 3, 1953 |
| 2,640,000 | Seyb et al. | May 26, 1953 |

FOREIGN PATENTS

| | | |
|---|---|---|
| 818,802 | France | Oct. 4, 1937 |
| 804,017 | Germany | Feb. 15, 1951 |

OTHER REFERENCES

Official Digest No. 347, pp. 982–996, Dec. 1953.